United States Patent
Floam et al.

(10) Patent No.: US 7,620,396 B2
(45) Date of Patent: Nov. 17, 2009

(54) MONITORING FOR RADIO FREQUENCY ACTIVITY VIOLATIONS IN A LICENSED FREQUENCY BAND

(75) Inventors: D. Andrew Floam, McLean, VA (US); Gary L. Sugar, Bethesda, MD (US); Neil R. Diener, Rockville, MD (US)

(73) Assignee: Cisco Technology, Inc., San Jose, CA (US)

( * ) Notice: Subject to any disclaimer, the term of this patent is extended or adjusted under 35 U.S.C. 154(b) by 626 days.

(21) Appl. No.: 11/345,391

(22) Filed: Feb. 2, 2006

(65) Prior Publication Data

US 2006/0178145 A1    Aug. 10, 2006

Related U.S. Application Data

(60) Provisional application No. 60/651,140, filed on Feb. 8, 2005.

(51) Int. Cl.
    H04W 4/00 (2009.01)
(52) U.S. Cl. .................. 455/434; 455/63.1; 455/67.13; 455/67.14; 455/418; 455/422.1; 455/446; 455/515
(58) Field of Classification Search .......... 455/63.1, 455/67.13, 67.14, 418, 422.1, 434, 446, 501, 455/515
    See application file for complete search history.

(56) References Cited

U.S. PATENT DOCUMENTS

| | | | |
|---|---|---|---|
| 5,491,837 A * | 2/1996 | Haartsen | 455/62 |
| 6,442,384 B1 * | 8/2002 | Shah et al. | 455/423 |
| 6,714,605 B2 | 3/2004 | Sugar et al. | |
| 6,850,735 B2 | 2/2005 | Sugar et al. | |
| 7,039,414 B1 * | 5/2006 | Nasshan | 455/448 |
| 2001/0055952 A1 * | 12/2001 | Ficarra | 455/67.3 |
| 2002/0137485 A1 * | 9/2002 | Nilsson et al. | 455/184.1 |
| 2002/0142744 A1 * | 10/2002 | Okanoue et al. | 455/226.1 |
| 2002/0155811 A1 * | 10/2002 | Prismantas et al. | 455/63 |
| 2003/0040277 A1 * | 2/2003 | Deats | 455/63 |
| 2003/0198200 A1 | 10/2003 | Diener et al. | |
| 2003/0224741 A1 | 12/2003 | Sugar et al. | |
| 2004/0028003 A1 | 2/2004 | Diener et al. | |
| 2005/0032479 A1 | 2/2005 | Miller et al. | |
| 2005/0159109 A1 * | 7/2005 | Kivekas et al. | 455/67.11 |
| 2006/0038677 A1 | 2/2006 | Diener et al. | |

* cited by examiner

Primary Examiner—Stephen M D'Agosta
(74) Attorney, Agent, or Firm—Edell, Shapiro & Finnan, LLC (57) ABSTRACT

Techniques for monitoring radio frequency (RF) activity in a frequency band where licensed spectrum service is occurring. One or more monitoring devices are deployed at one or more locations in the coverage area of a licensed spectrum service provider. For example, the monitoring device may be integrated into a base station of a licensed spectrum service provider. Each monitoring device receives RF energy and detects whether the radio frequency energy contains activity not associated with the licensed spectrum service provider and whether there is a violation of a secondary usage policy.

18 Claims, 5 Drawing Sheets

MONITORING FOR RADIO FREQUENCY ACTIVITY VIOLATIONS IN A LICENSED FREQUENCY BAND

RELATED APPLICATION

This application claims priority to U.S. Provisional Application No. 60/651,140, filed Feb. 8, 2005, the entirety of which is incorporated herein by reference.

BACKGROUND OF THE INVENTION

In an effort to increase the efficiency of spectrum use for wireless communications, spectrum regulatory authorities are proposing ways to share spectrum otherwise licensed to a particular service provider.

One proposal introduced by the U.S. Federal Communications Commission (FCC) is to permit otherwise unlicensed devices to transmit in a frequency band that has been licensed to a service provider by the regulatory authority for exclusive use. According to a proposed secondary usage policy, these so-called unlicensed devices may transmit in a licensed frequency band as long as the radio energy they emit stays below an interference threshold thereby not degrading the licensed spectrum service's providers operations.

Alternatively, the FCC may permit secondary devices to transmit in a licensed spectrum as long as these devices first measure the spectrum and determine that no licensed devices are active in the area during a time interval when it is desired to make a transmission from an unlicensed device. This is referred to as a "Cognitive Radio" approach.

In the event these proposals are adopted, a need may arise to enforce compliance with the interference threshold and other conditions that are established to permit sharing of licensed spectrum.

SUMMARY OF THE INVENTION

Briefly, according to one aspect of the invention, techniques are provided for monitoring radio frequency (RF) activity in a frequency band where licensed spectrum service is occurring. One or more monitoring devices are deployed at one or more locations in the coverage area of a licensed spectrum service provider. For example, the monitoring device may be integrated into a base station of a licensed spectrum service provider. Each monitoring device receives RF energy and detects whether the radio frequency energy contains activity not associated with the licensed spectrum service provider. Further, each monitoring device measures an impact on the licensed spectrum service provider for RF activity determined not to be associated with the licensed spectrum service provider and whether there is a violation of a secondary usage policy. In addition, the monitoring device may capture and store data representing one or more emissions that impacts the licensed spectrum service provider in the coverage area. Using the captured and stored data, the monitoring device may generate a report containing data derived from the captured data, and forward the report to the licensed spectrum service provider and/or to a spectrum regulation authority.

The above and other objects and advantages will become readily apparent when reference is made to the following description taken in conjunction with the accompanying drawings.

DETAILED DESCRIPTION

Figure 1:
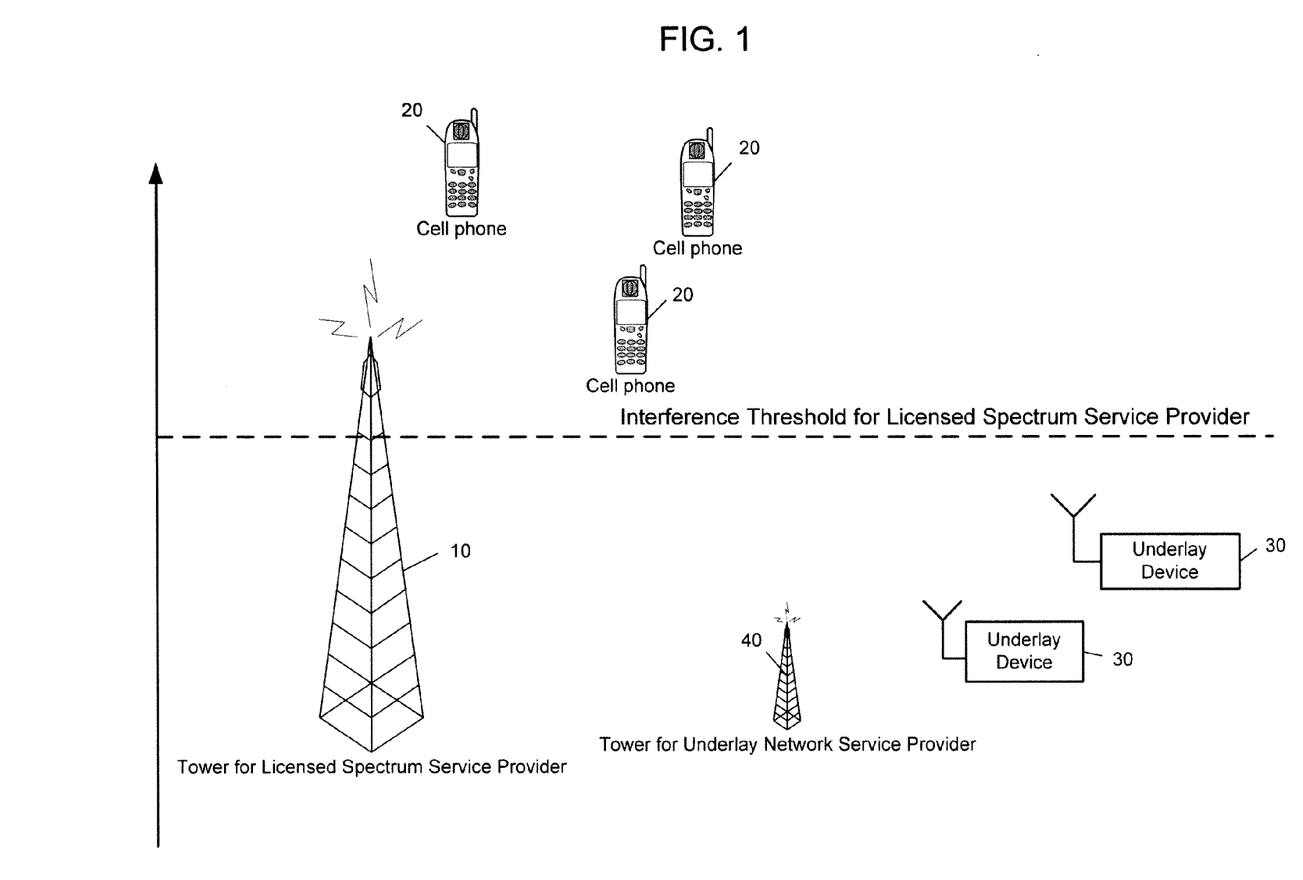
FIG. 1 is system block diagram showing a radio frequency (RF) environment where a licensed spectrum service provider may overlap with other devices not licensed to use that spectrum.

Referring first to FIG. 1, an RF environment is shown in which a licensed spectrum service provider having a tower 10 provides wireless communication services to a plurality of mobile stations, e.g., cell phones 20. As known in the art, there are multiple towers in a network positioned at various positions across a large geographic area depending on where the service provider has purchased spectrum licenses for operation.

According to recent proposals made by the U.S. Federal Communications Commission (FCC), the FCC is considering making the licensed spectrum purchased by service providers available to use by other wireless devices subject to certain parameters pertaining to interference tolerable by the licensed spectrum service providers. The FCC has introduced the concept of an "interference temperature" to be used as a guide as to the level of interference at a particular location in the licensed spectrum service provider network. The premise of the FCC's proposal is to permit other devices, called "underlay network" devices (ULDs) to operate in the same spectrum used by a licensed spectrum service provider as long as the underlay devices do not create interference above an interference threshold with respect to the licensed spectrum service provider (a licensed service provider base station or a subscriber device). The ULDs may consist of one or more mobile devices shown at reference numeral 30 each of which have bi-directional communication with each other or communicate via a tower 40.

Alternatively, the FCC may allow the ULDs to operate in the same spectrum used by a licensed spectrum service provider as long as the ULDs sense the spectrum to determine that there are no licensed devices currently operating in the area where the ULD wishes to make a transmission to another ULD.

Figure 2:
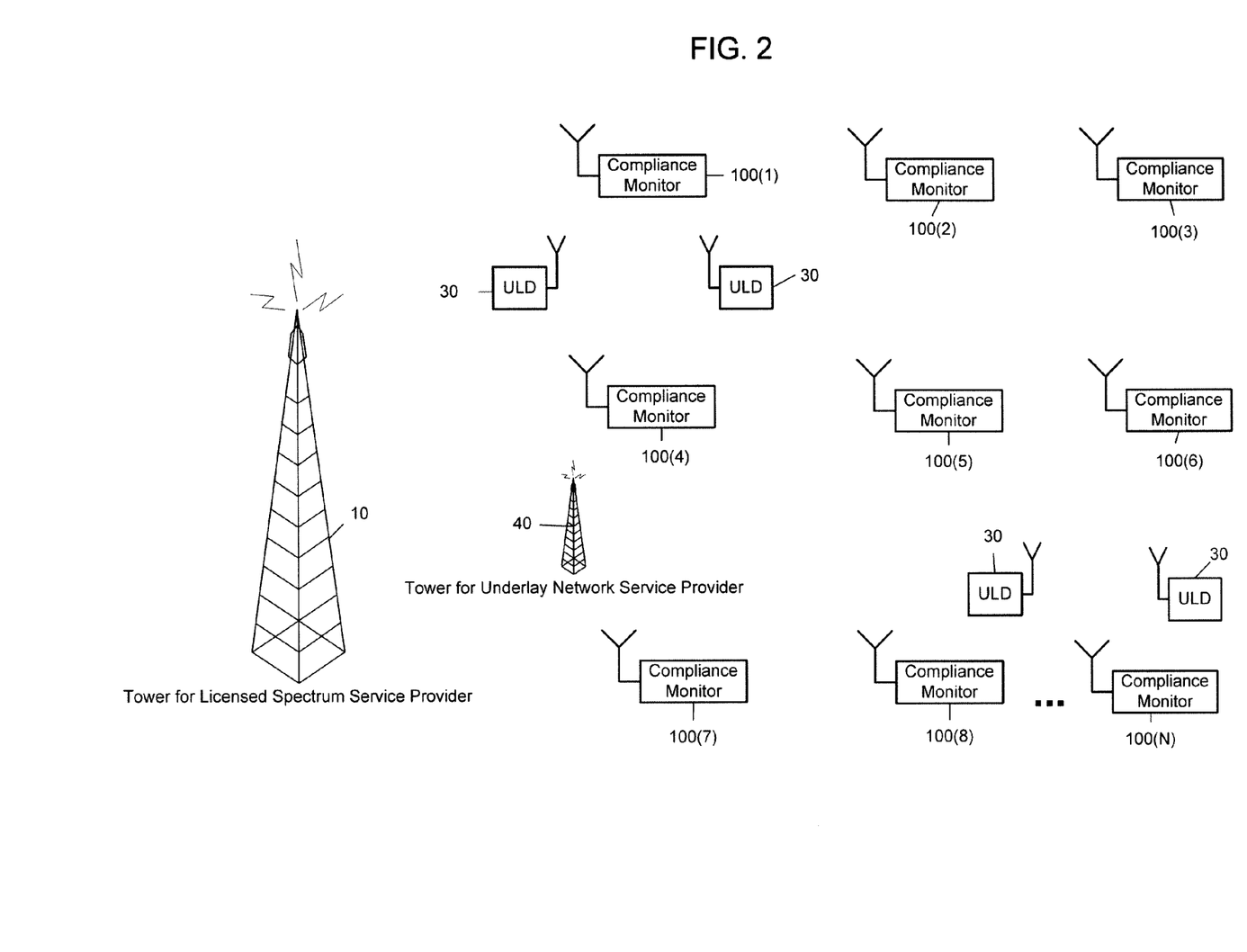
FIG. 2 is a block diagram showing a grid network of compliance monitor devices the monitor RF activity at various locations of the coverage of a licensed spectrum provider.

Turning to FIG. 2, one of the FCC proposals is to deploy a grid of monitor devices across the coverage area of a licensed service provider that receive RF energy in the band of interest to determine whether any signals transmitted in the same band is exceeding the interference threshold, or is otherwise operating in violation of secondary usage policy. In essence, these monitor devices will continuously monitor interference temperature across the coverage region of a licensed spectrum service provider. For purposes of the techniques described herein, these monitoring devices are referred to as compliance monitors and are shown at reference numeral 100(i) for i=1 to N. Each compliance monitor will perform additional monitoring functions described below.

Figure 3:
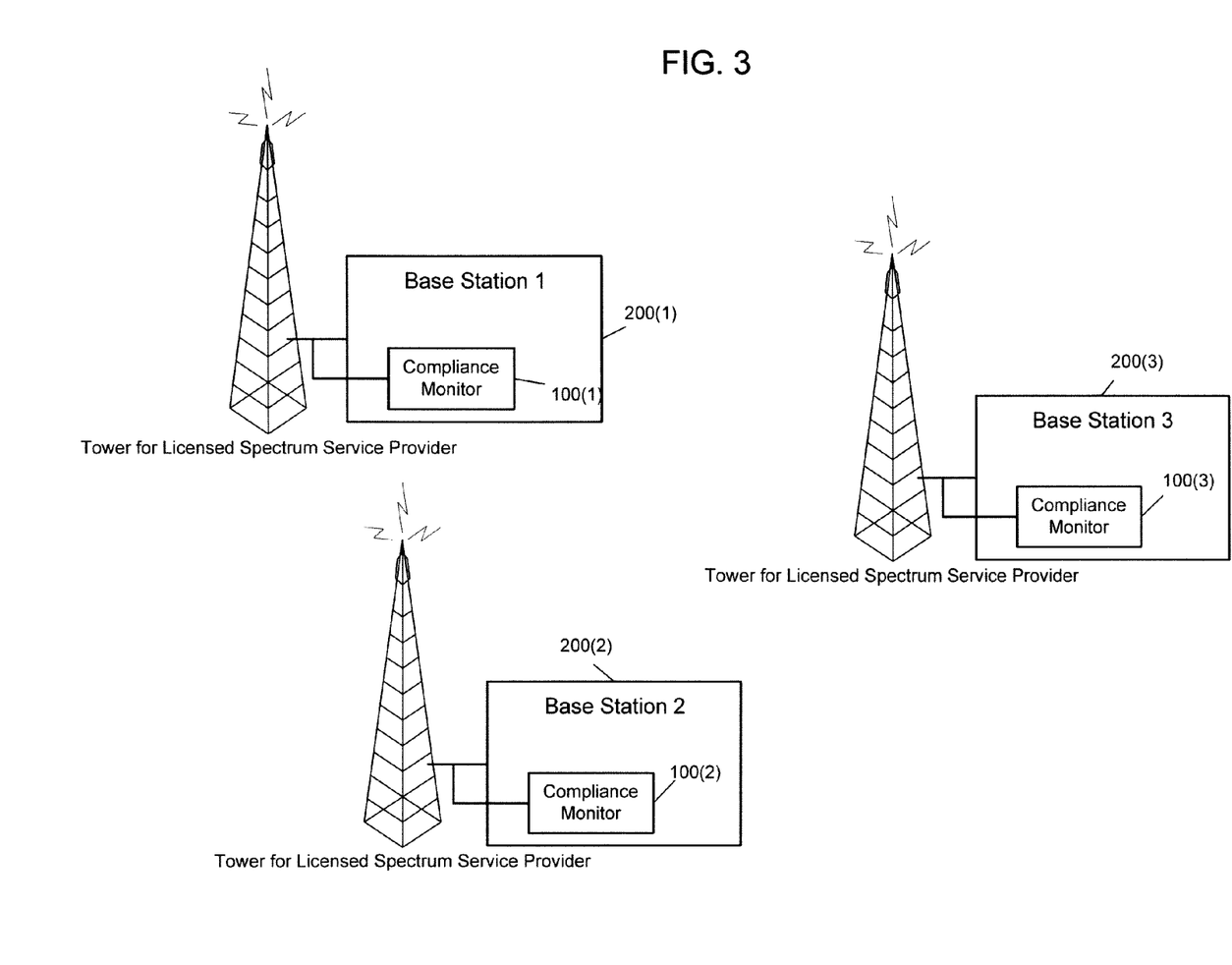
FIG. 3 is a block diagram of a compliance monitor integrated into a base station of a licensed spectrum service provider.

In addition, as shown in FIG. 3, the compliance monitors 100(1), 100(2), 100(3) may be integrated into a corresponding one or more base stations 200(1), 200(2) and 200(3) associated with a licensed spectrum service provider. The compliance monitor connects to the base station antenna and analyzes the same RF energy that the base station antenna detects. In this way, the compliance monitor 100(i) can determine whether there is RF activity occurring that impacts the operations of the associated base station 200(i).

Figure 4:
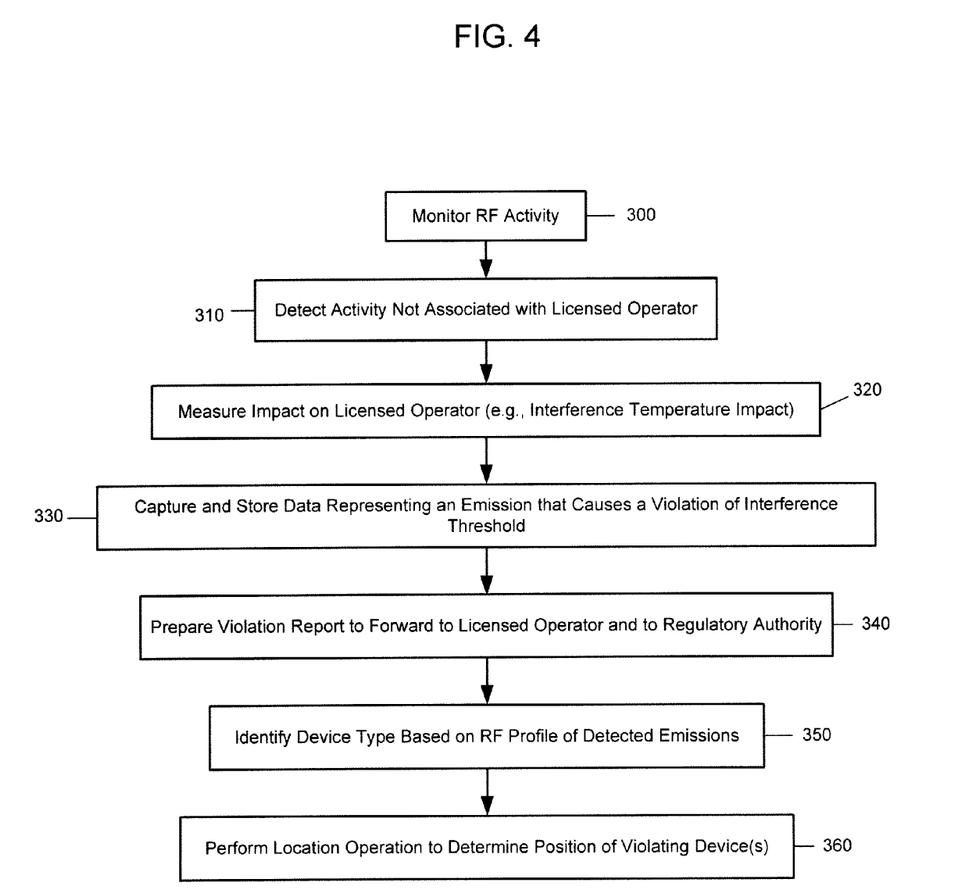
FIG. 4 is a flow chart of a process useful in a compliance monitor.

FIG. 4 illustrates a flow chart for a particular monitoring function of the compliance monitors. Each compliance monitor performs the following steps or functions:

At 300, the compliance monitor monitors RF activity based on the RF energy it receives in one or more frequency bands of interest. A compliance monitor may be continuously monitoring the one or more frequency bands, or may be sampling the frequency bands periodically (or on demand) for predetermined intervals of time. At 310, the compliance monitor analyzes the received RF energy to detect whether there is RF activity occurring that is not associated with the licensed spectrum service provider (a base station or a subscriber device). An explanation of how a compliance monitor performs the analysis of step 310 is described further hereinafter. Next, at 320, the compliance monitor measures the impact on the licensed spectrum service provider by generating an interference temperature metric, or alternatively, by measuring an impact on the licensed spectrum service provider caused by ULDs to determine whether the ULDs are operating in violation of a secondary usage policy (i.e., a ULD may not transmit when there is licensed service provider activity). In this latter case, the compliance monitor detects as a violation of the secondary usage policy the simultaneous presence of a signal that matches the profile of the licensed service provider (originating from a base station or subscriber device) and a signal that fits a profile of a ULD. Next, at 330, the compliance monitor captures and stores data representing the one or more emissions that cause a violation of an interference threshold or secondary usage policy. At 340, the compliance monitor prepares a violation report related to a violation of the interference threshold, including the interference temperature metric. The violation report may contain information obtained from the previous step and may include spectral characteristics of the violating emission(s). In addition, the report may contain captured digital samples of the received energy contributing to the violation.

At 350, if possible, the compliance monitor may perform processing on the data pertaining to the received RF energy to identify the device type. Examples of techniques to perform such identification or classification are described in commonly assigned U.S. Pat. No. 6,850,735 B2, as well as commonly assigned and co-pending U.S. application Ser. No. 10/420,362, filed Apr. 22, 2003 entitled "System and Method for Classifying Signals Occurring in a Frequency Band," U.S. application Ser. No. 10/628,603, filed Jul. 28, 2003, entitled "System and Method for Classifying Signals Using Timing Templates, Power Templates and Other Techniques," U.S. application Ser. No. 10/830,414, filed Apr. 22, 2004, entitled "Signal Classification Methods for Scanning Receiver and Other Applications." The data for this report may be sent by way of an email message to the licensed spectrum service provider and/or to the FCC itself or some FCC designated entity. The licensed spectrum service provider may take action to locate and request disabling or changes to the manner in which the violating device or network is operating. In addition, the FCC may use this report to follow up with actions it deems appropriate against the violating device/network.

In addition, as an optional feature, at 360, the position of the one or more devices that are the source of the violating emissions may be determined. Examples of techniques that may be used to locate the violating devices include global positioning techniques, receive signal strength techniques, time of arrival techniques, time difference of arrival techniques, angle of arrival, etc.

Figure 5:
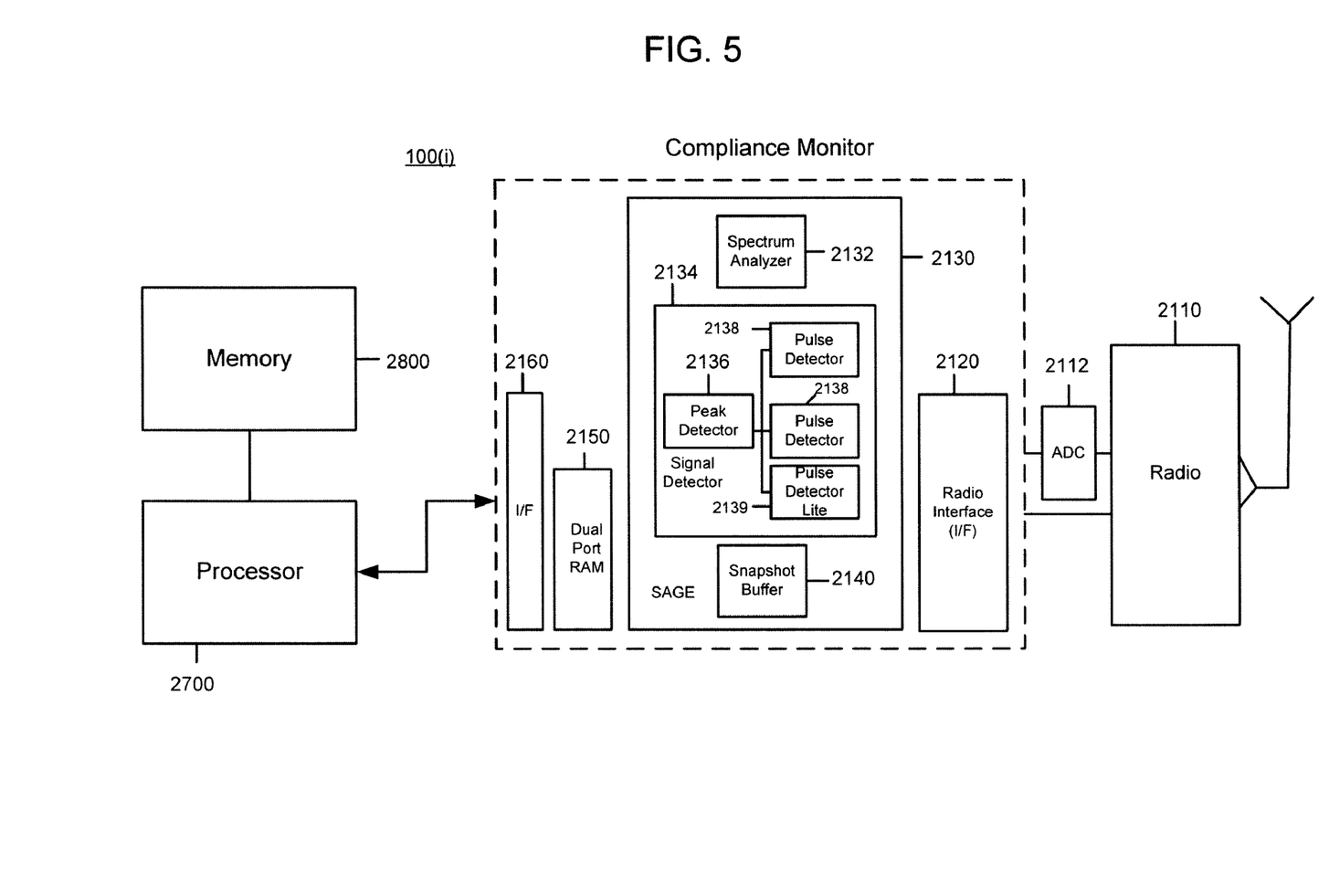
FIG. 5 is a block diagram of an exemplary compliance monitor.

FIG. 5 is a block diagram of an exemplary compliance monitor 100(i). Each compliance monitor 100(i) comprises a radio 2110 (primarily for receive operations) that is capable of tuning to receive energy at each channel (or simultaneously all channels in a wideband mode) of, for example, any of a variety of frequencies that are to be monitored. An analog-to-digital converter (ADC) 2112 is coupled to the radio 2100 that converts the downconverted signals from the radio 2100 to digital signals. A radio interface (I/F) 2120 is coupled directly to the radio 2100 and also to the output of the ADC 2112.

The compliance monitor 100(i) includes a spectrum monitor section 110 that includes the circuits necessary to analyze digital samples of the received signals. A real-time spectrum analysis engine (SAGE) 2130 is coupled to the radio I/F 2120. The SAGE 2130 includes a spectrum analyzer 2132, a signal detector 2134 consisting of a peak detector 2136 and one or more pulse detectors 2138 and 2139, and a snapshot buffer 2140. A Fast Fourier Transform (FFT) block (not shown) is coupled between the I/F 2120 and the spectrum analyzer 2132, or included in the spectrum analyzer 2132. The SAGE 2130 generates spectrum activity information that is used in the sensor and/or the server to determine the types of signals occurring in the frequency band, and captures signals for location measurement operations. A dual port random access memory (RAM) 2150 is coupled to receive the output of the SAGE 2130 and a processor I/F 2160 interfaces data output by the SAGE 2130 to a processor 2700, and couples configuration information from the processor 2700 to the SAGE 2130.

The functions of the SAGE 2130 will be briefly described in further detail hereinafter, but more details on the SAGE can be found in commonly assigned U.S. Pat. No. 6,714,605, commonly assigned co-pending U.S. application Ser. No. 10/420,511, filed Apr. 22, 2003, entitled "System and Method for Real-Time Spectrum Analysis in a Radio Device," and commonly assigned co-pending U.S. Provisional patent application Ser. No. 10/909,450, filed Aug. 2, 2004, entitled "Pulse Detection Scheme for Use in Real-Time Spectrum Analysis." The spectrum analyzer 2132 generates data representing a real-time spectrogram of a bandwidth of radio frequency (RF) spectrum, such as, for example, up to 100 MHz. The spectrum analyzer 2132 may be used to monitor all activity in a frequency band, for example, the 2.4-2.483 GHz ISM band, or the 5.15-5.35 GHz and 5.725-5.825 GHz UNII bands. The FFT block referred to above is, for example, a 256 frequency bin FFT block that provides (I and Q) FFT data for each of 256 frequency bins that span the bandwidth of the frequency band of interest. An FFT block with greater resolution or bandwidth may be used as well. A spectrum correction block may be included to correct for I and Q channel imbalance by estimating an I-Q channel imbalance parameter related to phase error and amplitude offset between the I and Q channels, and to suppress a side tone resulting from the RF downconversion process. The spectrum analyzer 2132 may further comprise a power computation block that computes (FFTdataI)$^2$ and (FFTdataQ)$^2$, respectively, and adds them together, to output a power value for each FFT frequency bin.

The spectrum analyzer 2132 may further include a stats logic block that has logic to accumulate statistics for average power, duty cycle, maximum power and a peaks histogram in various frequency bins or frequency sub-bands of the bandwidth of spectrum that the compliance monitor samples. Statistics are accumulated in the dual-port RAM over successive FFT time intervals. After a certain number of FFT intervals, determined by a configurable value stored in the spectrum analyzer control registers, an interrupt is generated to output the stats from the dual-port RAM. For example, the stats are maintained in the dual-port RAM 2150 for 10,000 FFT intervals before the processor reads out the values. The power versus frequency data generated by the spectrum analyzer 2132 is also used as input to the signal detector.

The signal detector 2134 detects signal pulses in the frequency band and outputs pulse event information entries, which include one or more of the start time, duration, power, center frequency and bandwidth of each pulse that satisfies configurable pulse characteristic criteria associated with a corresponding pulse detector.

In the signal detector 2134, the peak detector 2136 looks for spectral peaks in the (power versus frequency data derived from FFT block output), and reports the bandwidth, center frequency and power for each detected peak. The output of the peak detector 2136 is one or more peaks and related information. The pulse detectors 2138 detect and characterize signal pulses based on input from the peak detector 2136. A pulse detector lite 2139 may be employed to generate pulse events in a manner slightly different from pulse detectors 2138, as described in the aforementioned co-pending application entitled "Pulse Detection Scheme for Use in Real-Time Spectrum Analysis" filed on Aug. 2, 2004.

The snapshot buffer 2140 collects a set of raw digital signal samples useful for signal classification and other purposes, such as location measurements. The snapshot buffer 2140 can be triggered to begin sample collection from either the signal detector 2134 or from an external trigger source, such as a signal from the processor, to capture received signal data for a period of time sufficient to include a series of signal exchanges. Alternatively, the snapshot buffer will be in a free-running state continuously storing captured and then in response to detecting the first signal (e.g., the Probe Request frame), the snapshot buffer is put into a post-store mode that extends long enough to capture the ACK frame signal data.

The processor 2700 performs the various processing algorithms described above on the output of the SAGE 2130. The processor I/F 2160 may be a Mini-PCI or PC-Card (e.g., Cardbus™) interface, or any other interface known in the art. While not shown in FIG. 4, there is also an LAN interface block (e.g., Ethernet) that is coupled to the processor 2700 to enable the sensor to communicate with the a server via a wired LAN connection. The processor 2700 may generate signals to control the radio 2110. Software programs are stored in the memory 2800 and the processor 2700 executes these software programs to perform various functions, including the functions shown in FIG. 4 describe above.

When the compliance monitor detects activity not associated with a licensed operator/service provider (step 310 in FIG. 4), the processor 2700 analyzes output of the spectrum monitor section 110. For example, the processor 2700 may execute a software program stored in the memory 2800 that causes the processor 2700 to analyze characteristics (bandwidth, duration, center frequency and power level) of pulses of energy detected by the spectrum monitor to determine whether those pulses are indicative of activity other than a licensed spectrum operator/service provider. Moreover, the processor 2700 may analyze accumulated statistics for average power, duty cycle, maximum power and the peaks histogram to determine whether the activity that is detected is not associated with a licensed operator/service provider. Further still, the processor 2700 may execute one or more signal classification algorithms (referred to above) to detect non-licensed activity (shown at step 350 in FIG. 4).

In step 320 of FIG. 4, the processor 2700 may analyze statistics such as average power, duty cycle and maximum power in various frequency bins to compute a measure of the impact of any detected unlicensed activity on the licensed operator. Further, the processor may use the statistics and other data produced by the spectrum monitor to compute the so-called interference temperature metric. Alternatively, the processor in the compliance monitor will detect the simultaneous presence of a signal that matches the profile of a licensed service provider (originating from a base station or subscriber) and a signal that fits the profile of an unlicensed device, as an indication that the ULD is transmitting in violation of the secondary spectrum usage policy.

In step 330, the processor 2700 may control the snapshot buffer 2140 to store digital data representing the unlicensed RF energy for a time interval, which the processor 2700 in turn stores in the memory 2800 for later reference.

In step 340, the processor 2700 may execute a program stored in the memory 2800 to compile data produced by the spectrum monitor 110 associated with the detected unlicensed RF activity for inclusion in an automatically generated report summarizing the alleged violation (transmitting at a power level above the interference temperature threshold, or merely transmitting at the same time that a licensed service provider has active transmissions.

The above description is intended by way of example only.

What is claimed is:

1. A method comprising:
   at a receiver device, receiving radio frequency (RF) energy at a location in a coverage area of a licensed service provider;
   at a computing device:
   detecting whether received RF energy includes activity not associated with the licensed service provider in a frequency band; and
   measuring an impact on the licensed service provider for activity determined not to be associated with the licensed service provider, wherein measuring comprises determining whether the activity not associated with the licensed service provider is a signal from an unlicensed device that is occurring at substantially the same time as a signal associated with service of the licensed service provider in violation of a secondary usage policy.

2. The method of claim 1, and further comprising capturing and storing data representing detected RF energy that impacts the licensed service provider in the coverage area.

3. The method of claim 1, and further comprising generating a report containing data derived from said measuring and sending the report to the licensed service provider and/or to a spectrum regulation authority.

4. The method of claim 1, wherein receiving, detecting and measuring are performed in a monitoring receiver device that is coupled to an antenna of a base station associated with the licensed service provider.

5. The method of claim 1, wherein measuring comprises determining whether the activity not associated with the licensed service provider exceeds a threshold.

6. The method of claim 1, wherein detecting comprises analyzing one or more of: average power, duty cycle and/or maximum power of energy in a particular sub-band; and bandwidth, duration, center frequency and/or power level of pulses of energy detected.

7. The method of claim 1, wherein detecting comprises analyzing the received energy to classify a signal contained in said energy.

8. The method of claim 1, wherein receiving comprises receiving RF energy at a plurality of different locations in the coverage area of the licensed service provider.

9. An apparatus comprising:
a radio receiver that is configured to receive radio frequency (RF) energy;
a spectrum monitoring unit coupled to the radio receiver that is configured to analyze energy received by said radio receiver to produce data representing time domain and frequency domain characteristics associated with received energy; and
a processor connected to said spectrum monitoring unit that analyzes the data produced by said spectrum monitoring unit to determine whether the received energy includes activity not associated with a licensed service provider in a frequency band, wherein the processor is configured to measure an impact on the licensed service provider for activity determined to be associated with the licensed service provider and to determine whether the activity not associated with the licensed service provider is a signal from an unlicensed device that is occurring at substantially the same time as a signal associated with service of the licensed service provider in violation of a secondary usage policy.

10. The apparatus of claim 9, wherein the processor is configured to capture and store in a memory data represented detected energy that impacts the licensed service provider in the coverage area.

11. The apparatus of claim 9, wherein the processor is configured to determine whether the activity not associated with the licensed service provider exceeds a threshold.

12. The apparatus of claim 9, wherein said spectrum monitoring unit is configured to produce said data that includes one or more of: average power, duty cycle and/or maximum power of energy in a particular frequency sub-band; and bandwidth, duration, center frequency and/or power level of pulses of energy detected.

13. The apparatus of claim 9, wherein said processor is configured to analyze the data produced by said spectrum monitoring unit to classify a signal contained in said energy.

14. The apparatus of claim 9, wherein said processor is configured to generate a report containing data derived from the captured data and to send the report to the licensed service provider and/or to a spectrum regulation authority.

15. A processor readable medium storing instructions, that when executed by a processor, cause the processor to:
analyze data representing received RF energy at a location in a coverage area of a licensed service provider to determine whether the received RF energy includes activity not associated with the licensed service provider;
measure an impact on the licensed service provider for activity determined not to be associated with the license service provider to determine whether the activity not associated with the licensed service provider is a signal from an unlicensed device that is occurring at substantially the same time as a signal associated with service of the licensed service provider in violation of a secondary usage policy.

16. The processor readable medium of claim 15, and further comprising instructions that, when executed by the processor, cause the processor to generate a report containing data derived the measured impact on the licensed service provider, and to send a report to the licensed service provider and/or to a spectrum regulation authority.

17. The processor readable medium of claim 15, wherein the instructions that cause the processor to measure comprise instructions that cause the processor to determine whether the activity not associated with the licensed service provider exceeds a threshold.

18. The processor readable medium of claim 15, wherein the instructions that cause the processor to analyze and measure are performed with respect to data for received RF energy at a plurality of different locations in the coverage area of the licensed service provider.

* * * * *

UNITED STATES PATENT AND TRADEMARK OFFICE
CERTIFICATE OF CORRECTION

PATENT NO. : 7,620,396 B2
APPLICATION NO. : 11/345391
DATED : November 17, 2009
INVENTOR(S) : Floam et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 914 days.

Signed and Sealed this

Fourteenth Day of December, 2010

David J. Kappos
*Director of the United States Patent and Trademark Office*